UNITED STATES PATENT OFFICE.

N ARTHUR LAURY, OF CAMDEN, NEW JERSEY, ASSIGNOR TO GENERAL CHEMICAL COMPANY, OF NEW YORK, N. Y., A CORPORATION OF NEW YORK.

WEIGHTING OF SILK.

1,238,307.  Specification of Letters Patent.  Patented Aug. 28, 1917.

No Drawing.  Application filed August 24, 1914.  Serial No. 858,311.

*To all whom it may concern:*

Be it known that I, N ARTHUR LAURY, a citizen of the United States, and a resident of Camden, Camden county, New Jersey, have invented certain new and useful Improvements in and Relating to the Weighting of Silk, of which the following is a specification.

My invention relates primarily to a new article of manufacture, namely, silk weighted with a compound of antimony and secondarily to methods of making such new article of manufacture and the chemical product or products entering into its manufacture, and the treatment of the waste or spent liquors for the recovery and use of the antimony left in the spent weighting liquors.

I have discovered that in order to bring antimony tri-chlorid ($SbCl_3$) where it or its contained antimony can be absorbed by silk advantageously, it is necessary to combine the antimony trichlorid with potassium bromid, sodium chlorid, or ammonium chlorid, all of which products of combination are double salts of antimony halid with an alkali metal halid and all of which are hereinafter embraced in the expression "an antimony alkali metal double halid." Of these compounds I prefer to use the double chlorid of antimony and sodium.

I illustrate my invention in its entirety by the following examples, but the details of these examples can be modified without departing from this, my, invention. The parts are by weight.

Example I.

*Making double chlorid of antimony and sodium.*

Fill a vessel, preferably a vertical cylinder, with lumps of stibnite; maintain this vessel at a temperature above the distilling point of antimony trichlorid, for example, at or about 225° C. Pass gaseous hydrochloric acid, preferably dried, into the lower portion of this vessel. Allow the products of the reaction thus caused to take place to pass out of the vessel into a suitable condenser; keep this condenser at such a temperature that the antimony trichlorid issues in a liquid form and the hydrogen sulfid escapes in gaseous form, *i. e.* above the melting point of antimony trichlorid, which is about 74° C.

When introducing stibnite into the top of the vessel keep the supply such that all the hydrochloric acid is utilized in the vessel.

To the liquid antimony trichlorid add sodium chlorid in the proportion of from $\frac{1}{2}$ to $\frac{3}{4}$ parts of sodium chlorid to each part of antimony trichlorid. Mix thoroughly and allow to cool; the cooled product is antimony sodium double chlorid.

If desired to transport or use in the form of a solution, dissolve this salt in the desired quantity of water with the aid of heat.

In place of stibnite, the following materials have been used as a source of antimony in the above process:

Precipitated sulfid of antimony;

Oxid of antimony, commercial or chemically pure;

A mixture of metallic antimony and chlorate of potash.

I have also prepared antimony trichlorid by passing gaseous hydrochloric acid over the molten sulfid, as well as into the gases formed by the volatilization of a part of the sulfid.

Example II.

*Weighting organzine silk with the product of Example I.*

Antimony sodium double chlorid is dissolved in water so that the solution has a specific gravity corresponding to 30° Bé. at 60° F. A solution of this density at 60° F. contains 32% of the salt and 68% of water. The silk, prepared for weighting according to established practice, is allowed to soak in this solution for one hour. It is then washed in cold water.

The silk is next steadily agitated for 45 minutes at a temperature of 160° F. in a fixing agent for antimony compounds such as a solution of sodium phosphate, having a specific gravity corresponding to 8° Bé. at 160° F. It is then washed in cold water.

The silk is next steadily agitated for one hour in a clarifying agent for antimony compounds such as a solution of sodium silicate with a specific gravity corresponding to 8° Bé. It is then washed in cold water.

The silk is next soaked for one hour in a solution of aluminum sulfate with a specific gravity corresponding to 10° Bé. as an auxiliary clarifier.

A thorough drying of the silk then completes the weighting process.

The antimony bath remaining can be strengthened up by the addition of antimony-sodium double chlorid in a suitable amount. When this is no longer feasible, I can recover the antimony content thereof as given in the next example.

*Example III.*

*Working up the antimony compound contained in the residual baths into usable antimony trichlorid.*

The residual bath is neutral or it may contain a small quantity of free hydrochloric acid.

Saturate it with hydrogen sulfid. Separate the precipitated sulfid of antimony by decanting and filtering.

Dry the precipitate.

It is now ready to be converted into antimony trichlorid and subsequently into antimony sodium double chlorid by the process above described.

When I refer in my claims to "a fixing agent" and to "a clarifying agent," I refer to such agents as are suitable respectively for fixing and clarifying an antimony compound.

What I claim is:

1. As a new article of manufacture weighted silk containing a compound of antimony as weighting agent.

2. The process of producing silk weighted with an antimony compound which consists in treating the silk to be weighted with an antimony compound, a fixing agent and a clarifying agent.

3. The process of producing silk weighted with an antimony compound which consists in treating the silk to be weighted with an antimony alkali metal double halid, a fixing agent and a clarifying agent.

4. The process of producing silk weighted with an antimony compound which consists in treating the silk to be weighted with an antimony alkali metal double chlorid, a fixing agent and a clarifying agent.

5. The process of producing silk weighted with an antimony compound which consists in treating the silk to be weighted with antimony sodium double chlorid, a fixing agent and a clarifying agent.

6. The process of producing silk weighted with an antimony compound which consists in treating the silk to be weighted with a solution of antimony-sodium double chlorid, a solution of sodium phosphate, and a solution of sodium silicate.

In testimony whereof I have hereunto set my hand in the presence of two subscribing witnesses.

N ARTHUR LAURY.

Witnesses:
H. H. JONES,
WM. T. WRIGHT.